United States Patent [19]
Nylund

[11] Patent Number: 5,230,861
[45] Date of Patent: Jul. 27, 1993

[54] FUEL ASSEMBLY FOR A LIGHT-WATER NUCLEAR REACTOR

[75] Inventor: Olov Nylund, Västerås, Sweden
[73] Assignee: ABB Atom AB, Västerås, Sweden
[21] Appl. No.: 817,491
[22] Filed: Jan. 7, 1992

[30] Foreign Application Priority Data
Feb. 11, 1991 [SE] Sweden .............................. 9100402

[51] Int. Cl.⁵ .............................................. G21C 3/34
[52] U.S. Cl. ................................. 376/439; 376/352; 376/310; 376/442; 376/440
[58] Field of Search ............... 976/439, 440, 442, 310, 976/438, 352, DIG. 264

[56] References Cited
U.S. PATENT DOCUMENTS

| | | | |
|---|---|---|---|
| 4,684,495 | 8/1987 | Wilson et al. | 376/352 |
| 4,849,161 | 7/1989 | Brown et al. | 376/439 |
| 4,889,684 | 12/1989 | Johansson | 376/444 |

Primary Examiner—Donald P. Walsh
Assistant Examiner—Meena Chelliah
Attorney, Agent, or Firm—Watson, Cole, Grindle & Watson

[57] ABSTRACT

A fuel assembly for a light-water nuclear reactor includes a plurality of vertical fuel rods (10, 42) which are arranged, in spaced relationship in a lateral direction, between a bottom tie plate (11, 44) and a top tie plate (12, 43), the bottom tie plate, defining through-going vertical channels (50) for conducting water through the bottom tie plate and into the spaces between the fuel rods. The bottom tie plate also defines horizontal channels (51, 52) which cross the vertical channels and which are preferably arranged, at edges (54) on the bottom tie plate, in open communication with the spaces between the fuel rods. Helical springs (61, 62) with horizontal symmetry axis are arranged in at least some of the horizontal channels where the horizontal channels cross the vertical channel so as to trap debris in the water passing upwardly through the through-going vertical channels.

7 Claims, 5 Drawing Sheets

FUEL ASSEMBLY FOR A LIGHT-WATER NUCLEAR REACTOR

BACKGROUND OF THE INVENTION

The present invention relates to a fuel assembly for a nuclear reactor of light-water type, comprising a plurality of vertical fuel rods which are arranged in spaced relationship between a bottom tie plate and a top tie plate, the bottom tie plate being provided with through-going, vertical channels for conducting water through the bottom tie plate and into the spaces between the fuel rods.

Experience shows that, for example in connection with repairs and service of a nuclear reactor, debris may enter and then move with the water which circulates through the reactor core. The debris may, inter alia, consist of metal shavings (borings) formed in connection with the repair of, for example, a steam separator, pieces of metal wire, or other foreign particles which have entered the system from the outside. The debris may give rise to abrasion damage may have serious consequences if it occurs on parts which are particularly easily damaged, such as fuel rods.

To avoid damage of the above-mentioned kind in pressurized-water reactors, it is known to form the bottom tie plates, already existing under the fuel rod bundles, with a large number of straight vertical holes in order for each bottom tie plate, besides its normal function, to function as a debris catcher in the form of a strainer and prevent debris from reaching the fuel rod bundle with control rod guide tubes and spacers.

SUMMARY OF THE INVENTION

According to the present invention, water channels in the bottom tie plate of a fuel assembly for a nuclear reactor of pressurized-water or boiling-water type are formed in a special way which provides efficient capture of debris, particularly if the debris consists of narrow, elongated objects such as pieces of wire and borings. The favorable result is obtained according to the invention by providing the bottom tie plate, in addition to through-going vertical channels, with horizontal channels which are adapted to cross the vertical channels, and by arranging helical springs with horizontal symmetry axis in the horizontal channels, at least where these cross the vertical channels. A helical spring of the kind mentioned may advantageously be adapted to extend along at least substantially the entire length of the horizontal channel in which it is placed. At edge sides of the bottom tie plate, the horizontal channels are preferably arranged in open communication with the spaces between the fuel rods, but it is possible, per se, for the horizontal channels to be closed at their ends.

Horizontal channels with helical springs may, according to a preferred embodiment of the invention, be arranged at different levels in the bottom tie plate. Preferably, horizontal channels with helical springs are arranged in one direction at one level in the bottom tie plate and at another direction, perpendicular to the first one, at another level in the bottom tie plate. The bottom tie plate may also be provided with channels free from helical springs, which channels are then preferably arranged at another level than those channels which contain helical springs.

BRIEF DESCRIPTION OF THE DRAWINGS

The invention will be explained in greater detail by describing embodiments with reference to the accompanying drawings, wherein FIG. 1, which is a vertical section through the line 1—1 in FIG. 2, shows an embodiment of a composed fuel assembly for a boiling-water reactor composed of four fuel assemblies according to the invention with one bottom tie plate on each fuel assembly.

DETAILED DESCRIPTION OF THE PREFERRED EMBODIMENTS

Figure 1:
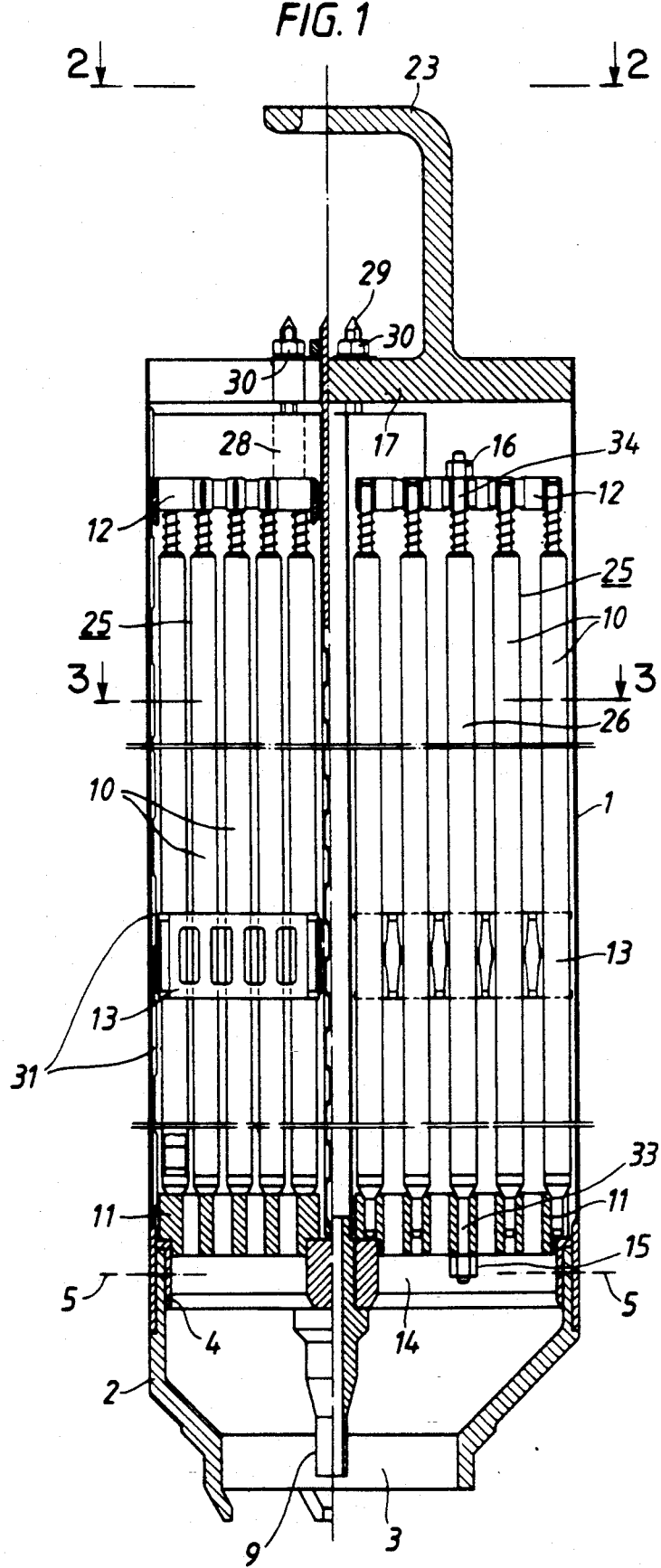
Figure 2:
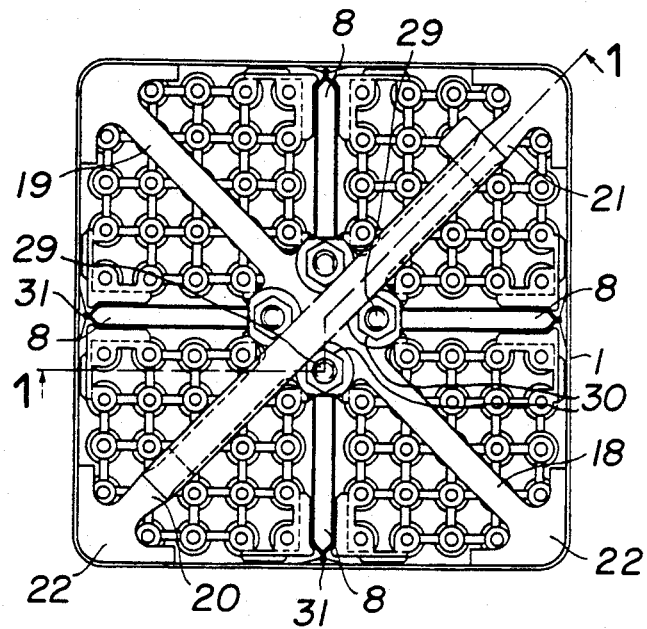
FIG. 2 shows the same composed fuel assembly in a view perpendicular to a horizontal plane through the line 2—2 in FIG. 1.
Figure 3:
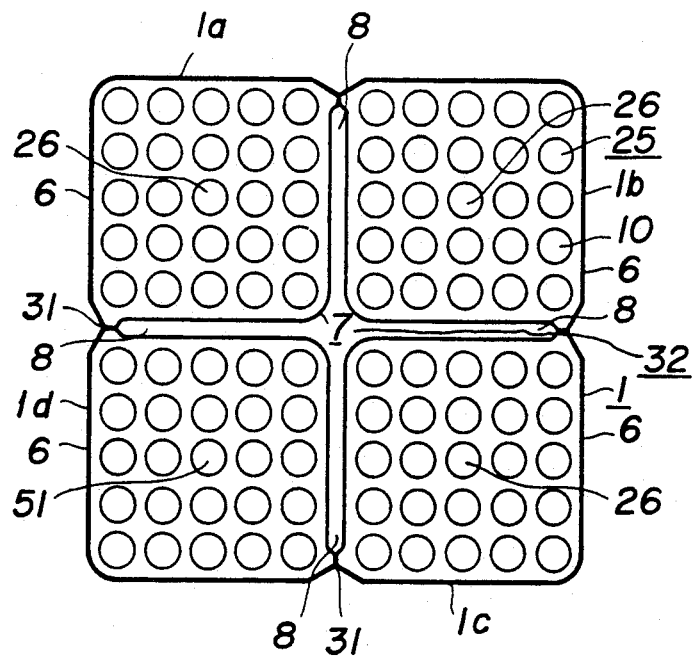
FIG. 3 shows a horizontal section through the line 3—3 in FIG. 1.

In FIGS. 1-3, 1 designates a fuel channel of substantially square cross section. The fuel channel surrounds, with no significant play, an upper, square portion of a bottom part 2 with a circular, downwardly-facing inlet opening 3 for cooling water and moderator water. Besides supporting the fuel channel 1, the bottom part 2 supports a supporting plate 4. At its lowermost part, the fuel channel 1 has a relatively thick wall portion which is fixed to the bottom part 2 and the supporting plate 4 by means of a plurality of horizontal bolts, indicated by dash-dotted lines 5. By means of a hollow supporting member 7 with cruciform cross section, the fuel channel 1 is divided into four vertical tubular parts 6 with at least substantially square cross section. The supporting member 7 is welded to the four walls 1a, 1b, 1c and 1d of the fuel channel and has four hollow wings 8. The central channel formed by the supporting member is designated 32 and is connected at the bottom with an inlet tube 9 for moderator water. Each tubular part 6 comprises a bundle 25 of twenty-five fuel rods 10. The rods are arranged in a symmetrical lattice in five rows each containing five rods. Each rod is included in two rows perpendicular to each other. Each bundle is arranged with a bottom tie plate 11, a top tie plate 12 and a plurality of spacers 13. A fuel rod bundle 25 with bottom tie plate 11, top tie plate 12, spacer 13 and tubular part 6 forms a unit which, in this application, is referred to as a fuel assembly, whereas the device illustrated in FIGS. 1-3 and comprising four such fuel assemblies is referred to as a composed fuel assembly. The four bottom tie plates 11 are supported in the composed fuel assembly by the supporting plate 4 and are each partially inserted into a corresponding square hole 14 therein. In each fuel assembly at least one of the fuel rods (tie fuel rod) is made with relatively long, threaded end plugs 33 and 34 of solid cladding material, the lower end plug 33 being passed through the bottom tie plate 11 and provided with a nut 15, the upper end plug 34 being passed through the top tie plate 12 and provided with a nut 16. In the embodiment shown the center rod 26 is formed in this way. This rod also serves as a spacer holder rod. An upper end portion of the fuel channel 1 surrounds a cruciform lifting plate 17 with four horizontal arms 18, 19, 20 and 21, which emanate from a common central portion. At its outer end each arm has an arrow-head-like portion 22, each of which makes contact with the inner wall surface of the fuel channel 1 at respective corners of the fuel channel 1. A lifting handle 23 is fixed to the arms 20 and 21. The lifting plate 17 and the handle 23 together form a lifting member of steel cast in one piece. The lifting plate 17 is fixed to the supporting member 7 by inserting each of four vertical bars 28 into a respective wing 8 of the supporting member 7 and welding them thereto. At the top each bar 28 has a vertical, bolt-like portion 29 which is passed, with a play, through a corresponding hole in the central portion of the lifting plate 17 and provided with a nut 30. As will be clear from the figures, the fuel channel 1 is provided with indentations 31, arranged intermittently in the longitudinal direction, to which the supporting member 7 is welded.

Figure 4:
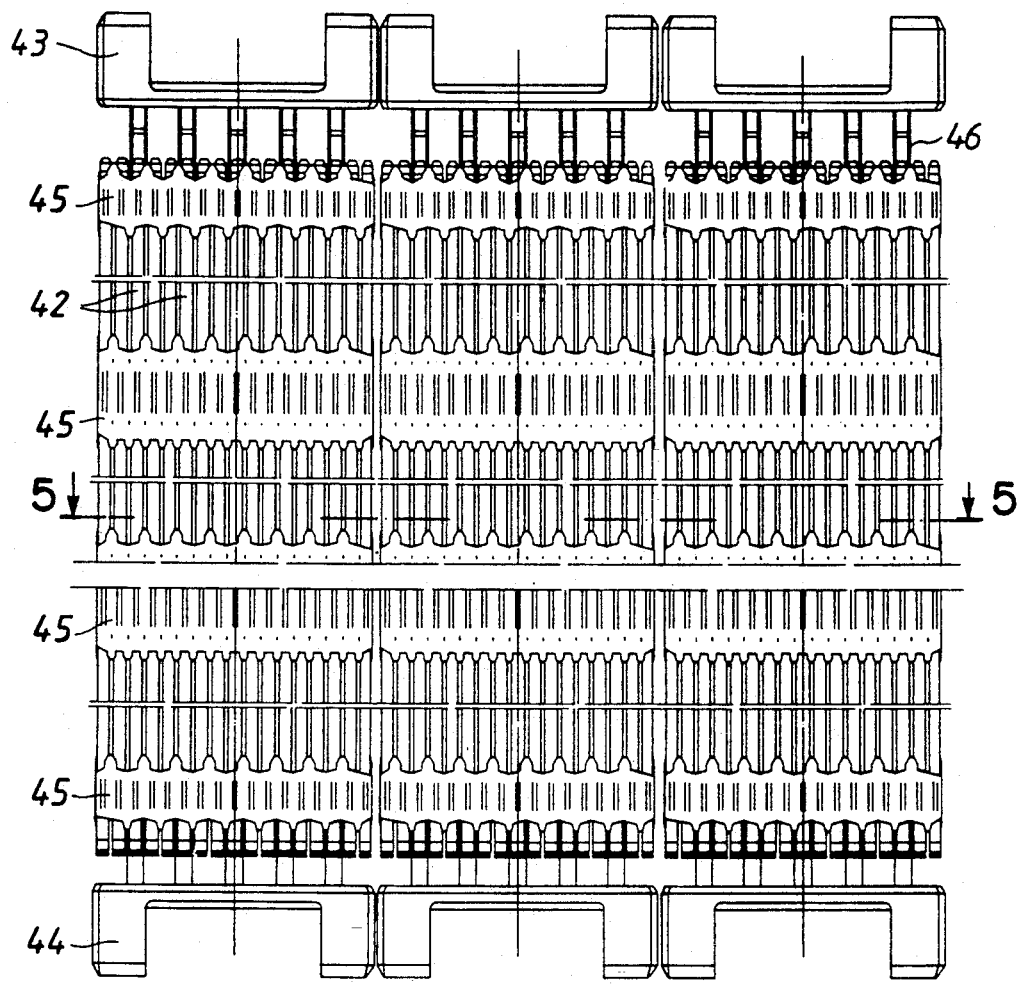
FIG. 4 shows a side view of an embodiment of a fuel assembly for a pressurized-water reactor according to the invention together with two adjacently positioned fuel assemblies of the same kind.
Figure 5:
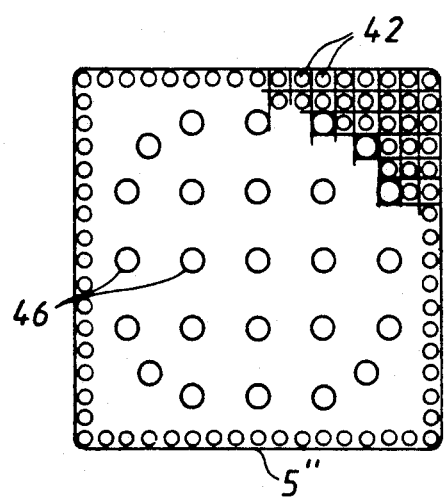
FIG. 5 shows a horizontal section along 5—5 through a fuel assembly in FIG. 4.

In FIG. 4, which shows three adjacently located fuel assemblies for a pressurized-water reactor, the vertical fuel rods are designated 42, the rectangular top tie plates designated 43, the rectangular bottom tie plates designated 44 and the spacer members by which the fuel rods are positioned designated 45. Guide tube members 46 for control rod pins are fixed at their upper ends to the top tie plates 43 and at their lower ends to the bottom tie plates 44. In addition, they are fixed to the spacer members 45.

Figure 6:
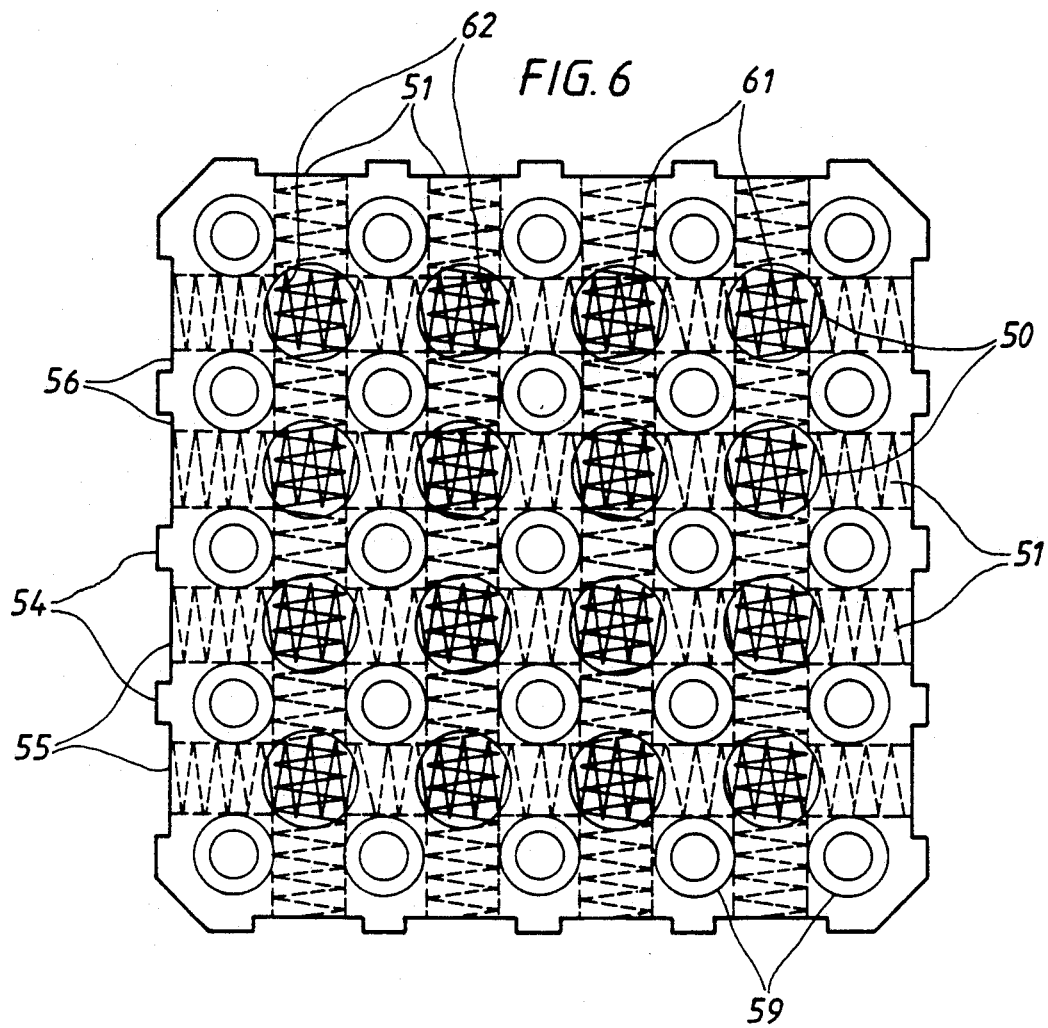
FIG. 6 shows a view from above of a bottom tie plate for a fuel assembly according to FIG. 1 and, in modified form, for a fuel assembly according to FIG. 4 on an enlarged scale.
Figure 7:
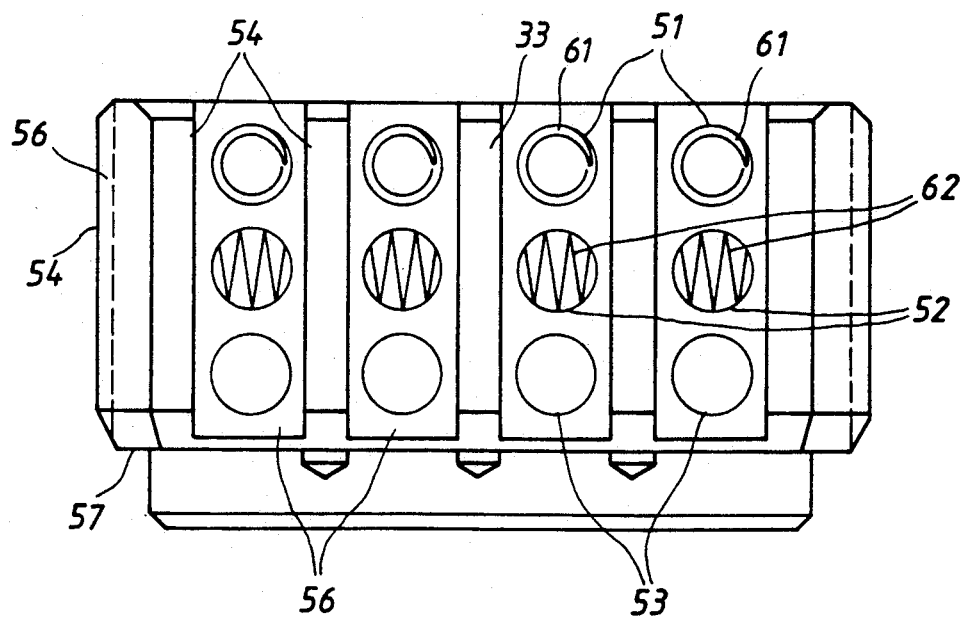
FIG. 7 shows a side view of the same bottom tie plate.

The bottom tie plate according to FIGS. 6 and 7 has through-going channels 50 for conducting water through the bottom tie plate, a number of horizontal channels 51 at a first level, a number of horizontal channels 52 at a second level, and a number of horizontal channels 53 at a third level. The horizontal channels 51, 52 and 53 cross the vertical channels 50 and are arranged at each level in two directions which are perpendicular to each other and which are also perpendicular to the edge sides 54 of the bottom tie plate. Each one of the channels 51, 52 and 53 extends between two opposite edge sides on the bottom tie plate. The horizontal channels are arranged, via their orifices 55, in open communication with the spaces between the fuel rods in the same fuel assembly for a boiling-water reactor or in the same and adjacent fuel assemblies in a pressurized-water reactor. The open communication is effected with recesses 56 in the edge sides 54 of the bottom tie plate. When the bottom tie plate according to FIGS. 6 and 7 is used in a fuel assembly for a boiling-water reactor, for example in the fuel assembly shown in FIG. 1, the surface 57 makes contact with the supporting plate 4 and the edge sides 54 with the fuel channel part 1, which results in the water passing through the orifices 55 flowing up to the space between the fuel rods 10. The water passing the channels 50 also flows up to the space between the fuel rods 10. The holes for the end plugs 33 of the fuel rods in the bottom tie plate are designated 59. When the bottom tie plate according to FIGS. 6 and 7 is used in the fuel assembly of a pressurized-water reactor, for example the fuel assembly shown in FIG. 4, the bottom tie plate has no holes 59 for fuel rods and the edge side 54 makes contact with an edge side in another fuel assembly of the same kind. Nor do the recesses 56 extend all the way down to the lower edge of the edge side 54, but two adjacent bottom tie plates make contact with each other along their entire horizontal extension along an edge at the bottom of each edge side. The water which has passed through the orifices 55 thereby flows via the recesses 56 up to the spaces between the fuel rods 42 above the bottom tie plate and into the spaces between adjacent fuel assemblies, since there are no partitions between the fuel assemblies.

In the horizontal channels 51 which are located at the top of the bottom tie plate and which are directed in the same direction, in accordance with the present invention helical springs 61 are arranged with their symmetry axis in a horizontal direction. They extend along the entire length of a horizontal channel. Analogously, helical springs 62 are arranged in the horizontal channels 52 located at the next lower level, but in a direction which is perpendicular to the direction in which the helical springs 61 are arranged. It is possible, per se, to arrange the helical springs 61 and 62 in the same direction but the capture effect for debris becomes greater if the helical springs are arranged in directions perpendicular to each other at the two levels. The channels 53 located at the lowest level do not contain any helical springs to ensure an effective function of the bottom tie plate by redundant flow also in case of a heavy accumulation of debris in the upper channels.

Figure 8:
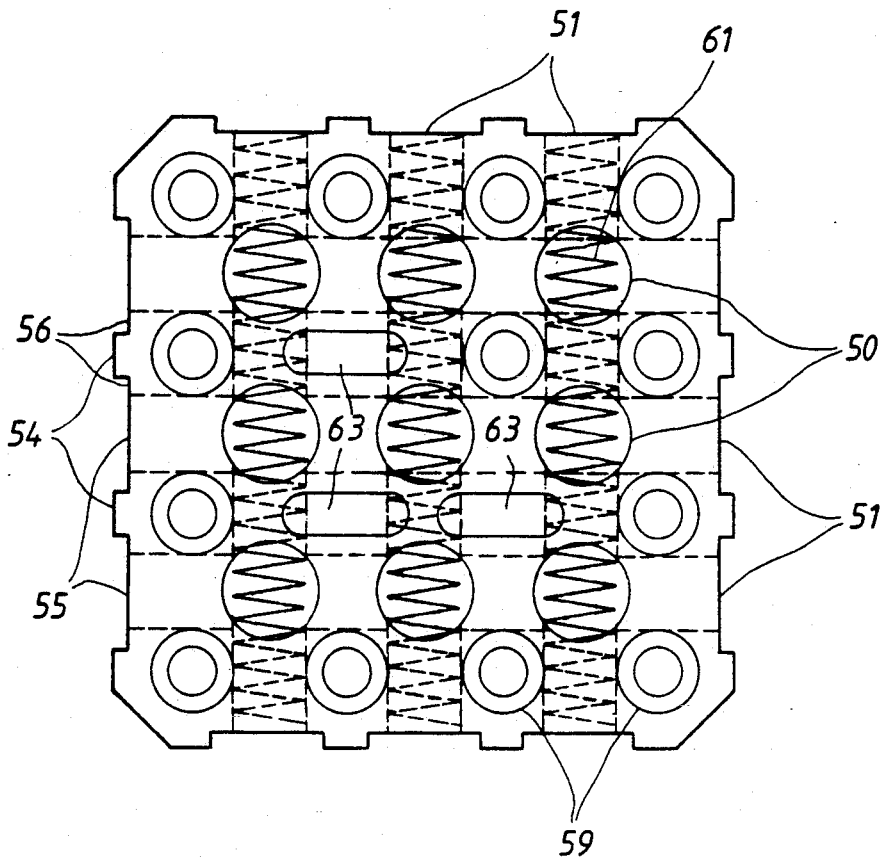
FIG. 8 shows a view from above of a bottom tie plate for another fuel assembly according to the invention.
Figure 9:
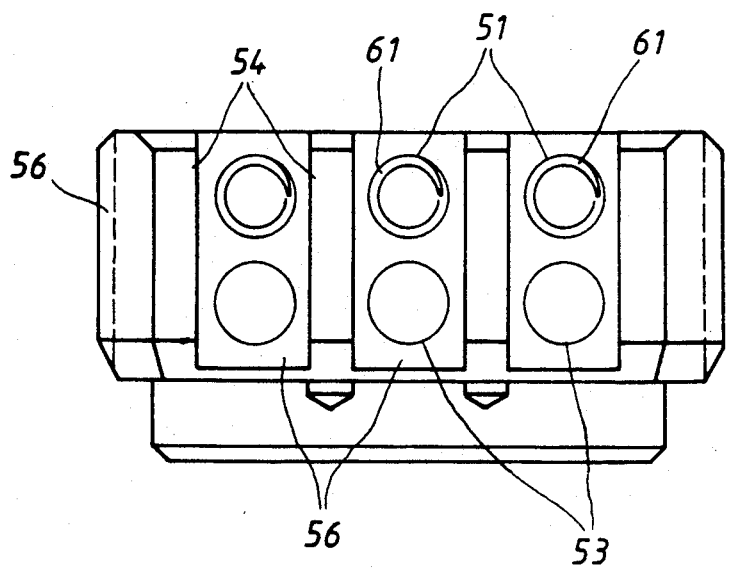
FIG. 9 shows a side view of the same bottom tie plate.

The bottom tie plate exemplified in FIGS. 8 and 9 is intended for a fuel assembly with sixteen fuel rods. In such a fuel assembly it function in the same way as the bottom tie plate illustrated in FIGS. 6 and 7 functions in a fuel assembly with twenty-five fuel rods. The designations from FIGS. 6 and 7 are retained in FIGS. 8 and 9 for parts in the two figures corresponding to each other. The bottom tie plate in FIGS. 8 and 9 contain horizontal channels 51 and 53 at two levels. In the channels 51 at the uppermost level, helical springs 61 are arranged in the channels which extend in the same direction between two opposite edge sides but not in the channels which extend perpendicularly thereto. The channels arranged at the lowest level do not contain any helical springs for reasons stated in connection with the description of FIGS. 6 and 7. The bottom tie plate according to FIGS. 8 and 9 is provided with through-going slits 63 for end pins for supporting fuel rods.

It is possible, while achieving an effective capture effect for debris, to arrange horizontal channels with helical springs only at one level without at the same time arranging horizontal channels without helical springs at a lower level, as is the case in the embodiment according to FIGS. 8 and 9. Debris accompanying the water through the horizontal channels 51, 52 and 53 will, to a considerable extent, adhere to the gaps 56 at the edge sides of the bottom tie plate.

A helical spring, which in accordance with the present invention is arranged across the water flow through the bottom plate, provides a moderate increase in pressure drop in relation to the projected surface since the throttling is distributed axially in the vertical channel. The helical spring is mechanically well guided in the horizontal channel, and therefore no locking in the channel is normally required. Any captured debris may be observed upon inspection, for example by transilluminating the horizontal channels.

Figure 10:
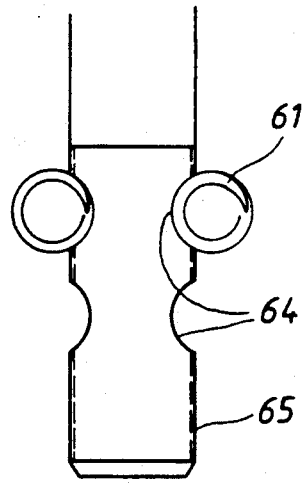
FIG. 10 shows a detail in an embodiment of a bottom tie plate for a fuel assembly according to the invention.

As illustrated in FIG. 10, the helical springs may be utilized for locking tie fuel rods and spacer holder rods in the fuel assemblies for a boiling water reactor. The end plug 65 of the rod is provided with horizontal slots or waists 64 adapted for this purpose. In such a case it may be advantageous to manufacture the helical spring by laser cutting of a tube which is left whole (uncut) in the locking positions or arranged with a slit so as to function as a resilient tube pin. In fuel assemblies for a pressurized-water reactor, the helical springs may be used in an analogous manner for locking the guide tubes for control rod pins.

I claim:

1. A fuel assembly for a light-water nuclear reactor comprising a plurality of vertical fuel rods which are arranged, in spaced relationship in a lateral direction, between a bottom tie plate and a top tie plate, the bottom tie plate defining through-going, vertical channels for conducting water through the bottom tie plate and into spaces between the fuel rods and horizontal channels which cross the vertical channels, and wherein helical springs with horizontal symmetry axis are positioned in said horizontal channels so as to extend across said vertical channels.

2. A fuel assembly according to claim 1, said helical springs extend along substantially the whole length of the horizontal channels.

3. A fuel assembly according to claim 1 wherein the bottom tie plate includes horizontal channels at spaced first and second vertical levels in the bottom tie plate, and wherein helical springs are positioned in the horizontal channels at said first and second vertical levels.

4. A fuel assembly according to claim 3, wherein said horizontal channels in said first level extend in parallel in a first direction and said horizontal channels in said second level extend in parallel in a second direction, said second direction being perpendicular to said first direction.

5. A fuel assembly according to claim 1, wherein the bottom tie plate includes horizontal channels which have no helical springs therein.

6. A fuel assembly according to claim 1, wherein the bottom tie plate defines side edges and wherein some of said horizontal channels extend to said side edges to be in open communication with the spaces between the fuel rods thereabove.

7. A fuel assembly for a boiling-water reactor according to claim 1, including tie fuel rods having end plugs which extend into said bottom tie plate, said end plugs having horizontal slots and wherein said helical springs are adapted to extend through said horizontal slots in said end plugs to lock the tie fuel rods in position.

* * * * *